United States Patent [19]

Proctor

[11] 4,251,550

[45] Feb. 17, 1981

[54] MEAL REPLACEMENT COMPOSITION

[75] Inventor: Richard I. Proctor, Loomis, Calif.

[73] Assignee: Elaine Powers Nutrition Company, Inc., Milwaukee, Wis.

[21] Appl. No.: 30,324

[22] Filed: Apr. 16, 1979

[51] Int. Cl.$^3$ ............................................. A23L 1/30
[52] U.S. Cl. ...................................... 426/72; 426/73; 426/74; 426/590; 426/656; 426/658; 426/804
[58] Field of Search ............... 426/580, 590, 585, 588, 426/656, 74, 601, 648, 658, 72, 73, 804

[56] References Cited

U.S. PATENT DOCUMENTS

| | | | |
|---|---|---|---|
| 2,860,051 | 11/1958 | Krehl et al. | 426/580 |
| 3,097,947 | 7/1963 | Kemmerer | 426/580 |
| 3,126,283 | 3/1964 | Noznick | 426/580 |
| 3,310,406 | 3/1967 | Webster | 426/74 |
| 3,432,306 | 3/1969 | Edwards | 426/580 |
| 3,968,268 | 7/1976 | Sair et al. | 426/580 |
| 3,988,511 | 10/1976 | Schapiro | 426/580 |

FOREIGN PATENT DOCUMENTS 2730158  1/1979  Fed. Rep. of Germany ........... 426/580

OTHER PUBLICATIONS

Smith et al., *Soybeans: Chemistry and Technology*, vol. 1, Revised Second Prnting, Proteins, pp. 310 and 311, 1978.

*Primary Examiner*—Raymond N. Jones
*Assistant Examiner*—George C. Yeung
*Attorney, Agent, or Firm*—Merriam, Marshall & Bicknell

[57] ABSTRACT

A dry nutritious food composition adapted for mixing with water to form an aqueous dispersion having a pleasing palatable taste with improved filling characteristics which is useful as a total meal replacement and which contains protein selected from the group consisting of casein, calcium caseinate, sodium caseinate and non-fat milk solids, lipids, carbohydrates and non-degradable vegetable fiber in the form of cellulose gum and cellulose gel and containing added vitamins, trace minerals and flavoring agents.

4 Claims, No Drawings

MEAL REPLACEMENT COMPOSITION

This invention relates generally to a dry food composition adapted for mixing with water to form a liquid composition useful as a total meal replacement and more particularly to a dry food composition readily dispersible in water to form a highly palatable, nutritious drink containing protein, lipids, carbohydrates, vitamins, minerals, non-degradable vegetable fiber and flavoring agents.

Various dry food compositions designed primarily for mixing with water have been developed heretofore. Some of these prior art dry food compositions which are adapted primarily for mixing with water have been designed to provide a very high protein diet with low residuals for use where the individual has a special dietary problem without providing a balanced diet (U.S. Pat. No. 3,950,547), while other dry food compositions intended for dispersing in water have been designed to provide a proper balance of protein, vitamins, fat and carbohydrates (U.S. Pat. No. 3,097,941) but fail to adequately satisfy an individual's feeling of hunger when the product is consumed as a total meal replacement and are not sufficiently palatable.

In order for any food composition used to control body weight to be of significant value and be acceptable as a total replacement for at least one meal each day over an extended period, it is essential that the composition have a pleasing taste and satisfy an individual's feeling of hunger when consumed and between meals. The dry, water dispersible food composition of the present invention is designed to provide the essential nutritional and health needs of an individual when used as a total meal replacement at least once each day for an extended period and contains a relatively high concentration of protein, vitamins and minerals along with sufficient lipids, carbohydrates and vegetable fiber to enable forming when mixed with only water a highly palatable liquid composition which fully satisfies the individual's feeling of hunger.

More particularly, the dry food composition of the present invention comprises a uniform mixture of ingredients which are readily dispersible in water and includes protein selected from the group consisting of casein, lactic casein, calcium caseinate and sodium caseinate, essential vitamins and most recommended trace minerals, saturated and unsaturated lipids, carbohydrates largely in the form of fructose, and vegetable fiber material which is not degradable when ingested together with selected natural and artificial flavoring agents.

The protein in the composition of the present invention is derived entirely from animal protein and consists of casein, calcium caseinate, sodium caseinate and non-fat milk solids. Each serving unit of the dry composition when mixed with water is designed to provide at least one-third the minimum recommended daily requirement for protein and preferably about 22 grams or about one-half the recommended minimum daily requirement (exclusive of any protein in a liquid dispersing medium). The protein content of the dry composition on a weight basis can range between about 25% to 50% but is preferably about 35%. The caseinates along with the casein serves to provide bulk to the liquid dispersion in addition to providing high quality protein which adds to the feeling of satisfaction when used as a total meal replacement.

The lipid content of the dry food composition can range between about 5% and 10% by wt. and is obtained largely from partially hydrogenated vegetable oils, such as soybean oil, corn oil or the like, with a small amount of added lecithin which also serves as a natural emulsifying agent. In one preferred embodiment the lipids preferably comprise about 8% by weight of the dry ingredients. The vegetable oil is hydrogenated sufficiently to stabilize the oil against oxidation so as to avoid the need for artificial preservatives without fully saturating the oil.

The carbohydrates of the composition are provided by natural sweeteners (i.e. sugar), preferably fructose, although other natural sugars, such as dextrose or corn syrup solids, can be used. The carbohydrate content of the dry composition in a preferable form comprises about 48% by wt. and is designed to provide in combination with the lipid content about 250 calories in each 62 gram unit serving of the aqueous dispersion. If desired, however, the carbohydrate can range between about 20% and about 50% on a dry wt. basis. The lipid content when combined with the carbohydrates and between about 0.4 and 5.0 percent on a dry weight basis of a non-degradable vegetable fiber imparts to the composition the characteristic of satisfying the individuals feeling of hunger for a prolonged period when used as a total meal replacement.

The fiber content of the dry food composition is an important ingredient of the present composition and contributes significantly to imparting bulk to the aqueous dispersion. The vegetable fiber ingredient used is selected from the class of cellulose gum and cellulose gel materials known as microcrystalline cellulose and has the characteristic of not being degraded when ingested in the stomach of a human being. When very finely ground the microcrystalline cellulose can be used in an amount up to about 5% by wt. of the dry composition. The microcrystalline cellulose when comprising about 0.5 to 1.0 percent by wt. of the composition is equivalent to about 10% by wt. of ordinary wheat bran, since the latter is partially digested in the intestinal tract of a human being. The microcrystalline cellulose can be obtained by the treatment of wood fiber, such as sulfide wood pulp, in the manner described in U.S. Pat. No. 3,023,104 and is suitable for use in the present composition.

Use of a non-degradable vegetable fiber material in a water dispersible food composition makes it possible to dispense with a significant amount of the filler material and lipids normally required in order to provide the composition with the required hunger satiating characteristic. And, as a result of using a non-degradable vegetable fiber material in the water dispersible composition it is possible to include in the present composition a sufficient amount of ingredients which impart to the composition when mixed only with water a pleasingly palatable taste, and the resulting liquid composition is much more palatable than the prior art compositions designed to be dispersed only in water.

Vitamin and mineral additives are used in the composition to provide each serving unit with a large proportion of the essential vitamins and minerals. For example, each serving unit of the composition is preferably designed to supply about 45% of the minimum daily requirements of vitamins and about 45% of most of the trace minerals.

The following examples illustrate the preparation of the dry food composition of the present invention and describes the manner of using the composition.

EXAMPLE 1

The ingredients for a dry food composition and the proportions used on a part by weight basis are as follows:

| | Ingredients | Serving Unit 62 grams 250 calories |
|---|---|---|
| (1) | Calcium caseinate | 23.0 |
| | Sodium caseinate | 5.9 |
| | Casein | 10.68 |
| | Lecithin | .15 |
| | Partially hydrogenated soy bean oil | 3.4 |
| | Natural and Artificial Vanilla Flavor | 0.9 |
| | Orange Flavor | 0.3 |
| | Instant fat-free dispersible milk solids | 25.4 |
| | Fructose | 25.4 |
| | Corn Syrup Solids | 4.5 |
| | Calcium Pyrophosphate | 1.9 |
| | Magnesium Oxide | 0.2 |
| | Vitamin Assay Core | 0.49 |
| | Vegetable fiber, non-degradable (very fine grind) | 0.4 |

In preparing the dry food mixture the fructose is added to a ribbon mixer and while the mixer is operating the casein is added and thoroughly mixed with the fructose. While the mixer is running the following ingredients are added to the mixer in the order mentioned and blended for about 5 minutes:

Lecithin
Artificial vanilla flavor and
Partially hydrogenated soy bean oil

The following ingredients are then added to the mixer while the mixer is stopped and thereafter blended for 5 minutes:

Calcium caseinate and sodium caseinate
Natural and synthetic vanilla flavors
Dispersing agent
Corn syrup solids
Calcium pyrophosphate
Magnesium oxide
Vitamin assay core
Vegetable fiber The instantized fat-free milk solids ingredient is added to the mixture and blended in the ribbon mixer for an additional 5 minutes. The mixture is then screened and packaged in a water impervious envelope, each containing 62 grams net weight.

It will be understood that while the composition described in the foregoing specific example has a vanilla flavor, other flavoring agents and flavor ingredients can be used in place of those indicated.

Each serving unit of the dry composition of the foregoing specific example (62 grams) supplies about 22 grams protein, about 30 grams carbohydrates and about 5 grams of lipids.

EXAMPLE 2

The following ingredients are used to prepare a dry nutritious food composition:

| | Ingredients | Serving Unit 62 grams 250 calories |
|---|---|---|
| (1) | Calcium caseinate and sodium caseinate - 75:25 (Savertone 460, Western Dairy Products, San Francisco, California) | 23.6 |
| | Casein | 10.68 |
| | Lecithin | .15 |
| | Partially hydrogenated soy bean oil (Durkex, Durkee Industrial Foods, Cleveland, Ohio) | 2.84 |
| | French vanilla Polak's Frutal Works, Middletown, N.Y.) | .69 |
| | Butter (Felton #428, Felton Industries, Brookland, New York) | .037 |
| | Vanilla flavor, Felton Industries, Brookland, New York) | .12 |
| | Instant fat-free dispersible milk solids | 25.4 |
| | Fructose | 25.4 |
| | Coffee Whitener (calcium caseinate, corn syrup solids, and partially hydrogenated vegetable oil - Beatrice Foods, Chicago, Ill. | 10.61 |
| | Calcium pyrophosphate | 1.9 |
| | Magnesium oxide | 0.2 |
| | Vitamin assay core | 0.49 |
| | Vegetable fiber, very fine grind (Avicel-Ph 101). | 0.4 |

The ingredients are mixed as in Example 1, screened and packaged in a water proof envelope to provide serving units of 62 grams. Each serving unit provides 250 calories, 22 grams of protein, 30 grams carbohydrates and 5 grams of lipids.

EXAMPLE 3

The following ingredients are used to prepare a dry food composition:

| | Ingredients | Service unit 48 grams 180 calories |
|---|---|---|
| (1) | Calcium caseinate | 23.4 |
| | Sodium caseinate | 7.3 |
| | Casein | 12.03 |
| | Lecithin | .185 |
| | Partially hydrogenated soy bean oil | .285 |
| | Natural and artificial vanilla flavor | 1.0 |
| | Fat-free dispersible milk solids | 32.93 |
| | Fructose | 20.99 |
| | Corn syrup solids | 1.2 |
| | Calcium pyrophosphate | 2.4 |
| | Magnesium oxide | 0.15 |
| | Vitamin assay core | .63 |
| | Vegetable fiber non-degradable (very fine grind) | 0.4 |

The above ingredients are blended in a ribbon mixer as in Example 1, screened and packaged in a water impervious envelope, each containing 48 grams net weight and 180 calories. Each serving unit (48 grams) supplies about 22 grams protein, about 20 grams carbohydrates and about 1 gram lipids.

The vitamin-mineral assay core used in each example has the following weight percent composition:
Vitamin A palmitate, 500,000 I.U. per gram—1.94
Ascorbic acid—11.7
Thiamine hydrochoride—0.288
Riboflavin—0.316

Niacin—3.74
Ferrous fumarate—9.00
Vitamin D, 500,000 I.U. per gram—0.150
dl-alpha tocopheryl acetate, 500 I.U. per gram—10.8
Pyridoxine hydrochloride—0.453
Folic acid—0.0781
Cyanocobalamin 0.1% triturate—1.08
Potassium iodide—0.0313
Zinc oxide—3.08
Copper sulfate, pentahydrate—0.825
Biotin—0.0531
Magnesium oxide—54.5
Calcium pantothenate—2.03

The vitamin-mineral assay core provides in each of the foregoing specific examples the following percentage of U.S. recommended daily allowance (U.S. RDA):

Viatmin A—45
Vitamin C—45
Thiamine—45
Riboflavin—45
Niacin—45
Calcium—45
Iron—45
Vitamin D—45
Vitamin E—45
Vitamin $B_6$—45
Folic Acid—45
Vitamin $B_{12}$—45
Phosphorus—45
Iodine—45
Magnesium—45
Zinc—45
Copper—45
Biotin—45
Pantothenic Acid—45

Each serving unit of the dry composition supplies the following amino acids:

*Isoleucine—1300 mgs
*Leucine—2060 mgs
*Lysine—1630 mgs
*Methionine—520 mg
Cystine—180 mg
*Phenylalanine—1020 mg
*Threonine—970 mg
*Tryptophane—300 mg
*Valine—1440 mg
Alanine—660 mg
Arginine—700 mg
Aspartic Acid—1400 mg
Glutamic Acid—4080 mg
Glycine—380 mg
Histidine—550 mg
Proline—2130 mg
Serine—1130 mg
Tyrosine—1070 mg
*Essential Amino Acids When preparing the dry food compositions of the present invention for use 8 ounces of cold water are poured into a shaker or a blender provided with a suitable lid and the contents of one unit serving package is emptied into the container of water. The dry food composition and water are shaken for approximately 25 seconds or mixed in a blender for about 5 seconds. If desiring a thinner consistency or if the aqueous dispersion is not to be consumed immediately after preparing, slightly more water can be used.

The resulting aqueous dispersion is a smooth pleasingly palatable drink which can be used as a total replacement for at least one meal each day and provide a sensible eating formula for those desiring to limit their caloric intake. The dry food composition in the present invention provides a complete well balanced diet including a relatively large amount of protein and essential vitamins and trace mineral, fat, carbohydrates and roughage in the form of non-degradable vegetable fiber. And, because of the pleasingly palatable taste of the water dispersed composition individuals wishing to reduce body weight or maintain body weight in a convenient and safe manner are more likely to continue use of the sensible eating formula of the present invention.

What is claimed is:

1. A dry nutritional food composition consisting essentially of:
   (1) protein material derived entirely from animal sources consisting of casein, calcium caseinate, sodium caseinate and non-fat milk solids providing a total protein content of between about 25 and 50 percent by weight,
   (2) carbohydrate selected from the group consisting of fructose, dextrose and corn syrup solids providing a total carbohydrate concentration of between about 20 and 50 percent by weight,
   (3) lipids in the form of partially hydrogenated vegetable oil along with a minor proportion of lecithin providing a total lipid content of between about 5 and 10 percent by weight,
   (4) non-degradable vegetable fiber consisting of cellulose gum and cellulose gel in the form of finely divided mincrocrystalline cellulose present in the composition in an amount between about 0.5 and 1.0 percent by weight,
   (5) flavoring agents in an amount of about one percent by weight along with vitamins and minerals, and
said nutritional food composition when mixed only with water being readily dispersible and forming a highly palatable liquid composition which contains sufficient bulk to avoid discomfort between meals when used as a complete meal replacement.

2. A dry nutritious food composition as in claim 1, wherein said protein comprises about 35% by wt. of said dry composition.

3. A dry nutritious food composition as in claim 1, wherein a serving unit of about 62 grams provides about 50 percent of the recommended daily requirement of protein, about 45% of the minimum recommended daily requirement of essential vitamins, supplies about 250 calories, and has a combined content of protein, carbohydrate, fat and vegetable fiber which satisfies the hunger feeling of an individual when used as a total meal replacement.

4. A dry nutritious food composition as in claim 1, wherein increased amounts of flavoring agents are incorporated in said composition as the content of said vegetable fiber is increased up to about 1% by wt.; whereby the composition can be provided with an improved pleasingly palatable taste.

* * * * *